US006545838B1

(12) United States Patent
Burton

(10) Patent No.: US 6,545,838 B1
(45) Date of Patent: Apr. 8, 2003

(54) SELF TUNING MODEL REFERENCE CONTROLLER IN A DISC DRIVE

(75) Inventor: Matthew C. Burton, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/552,604

(22) Filed: Apr. 19, 2000

Related U.S. Application Data

(60) Provisional application No. 60/130,311, filed on Apr. 21, 1999.

(51) Int. Cl.$^7$ .............................................. G11B 5/596
(52) U.S. Cl. ................................ 360/78.06; 360/78.07
(58) Field of Search .......................... 360/78.06, 78.07, 360/78.08

(56) References Cited

U.S. PATENT DOCUMENTS

| | | | |
|---|---|---|---|
| 4,616,276 A | 10/1986 | Workman | |
| 4,638,230 A | 1/1987 | Lee | |
| 4,679,103 A | 7/1987 | Workman | |
| 4,697,127 A | 9/1987 | Stich et al. | |
| 4,775,903 A | 10/1988 | Knowles | |
| 4,899,234 A | 2/1990 | Genheimer | |
| 4,969,059 A | 11/1990 | Volz et al. | |
| 5,150,266 A | 9/1992 | Albert | |
| 5,191,568 A | 3/1993 | Muto et al. | |
| 5,262,907 A | 11/1993 | Duffy et al. | |
| 5,381,282 A | 1/1995 | Arai et al. | |
| 5,402,280 A | 3/1995 | Supino | |
| 5,539,714 A | 7/1996 | Andrews, Jr. et al. | |
| 5,585,976 A | 12/1996 | Pham | |
| 5,680,272 A | 10/1997 | Kadlec et al. | |
| 5,768,226 A | 6/1998 | Ogino | |
| 6,031,684 A | 2/2000 | Gregg | |
| 6,125,000 A | * 9/2000 | Carlson et al. | .......... 360/78.08 |

FOREIGN PATENT DOCUMENTS

EP     0 464 992 A1     1/1992

OTHER PUBLICATIONS

"Design Of Mode Switching Controller With Initial Value Compensation And Its Application to Disk Drive Servo Control;" 13$^{th}$ Triennial World Congress, San Francisco, USA, 1996 IFAC.
"Mode Switching Control Design with Initial Value Compensation and Its Application to Head Positioning Control on Magnetic Disc Drives;" IEEE Transactions on Industrial Electronics, vol. 43, No. 1, Feb., 1996.

* cited by examiner

*Primary Examiner*—David Hudspeth
*Assistant Examiner*—Mitchell Slavitt
(74) *Attorney, Agent, or Firm*—Fellers, Snider, et al.

(57) ABSTRACT

Method and apparatus for moving a head of a disc drive from an initial position to a destination position on a recording surface of a rotatable disc by generating and applying a model reference current to an actuator motor. A servo circuit includes a current profile generator which generates a baseline reference current profile. A gain calculator calculates first and second gain factors in relation to an initial velocity of the head. A gain block generates the model reference current by applying the first gain factor to a first portion of the baseline reference current profile used to accelerate the head and subsequently applying the second gain factor to a second portion of the baseline reference current profile used to decelerate the head, wherein the first and second gain factors have different respective magnitudes to compensate for a nonzero initial velocity of the head.

9 Claims, 5 Drawing Sheets

SELF TUNING MODEL REFERENCE CONTROLLER IN A DISC DRIVE

RELATED APPLICATIONS

This application claims priority to Provisional Application No. 60/130,311 filed on Apr. 21, 1999.

FIELD OF THE INVENTION

This invention relates generally to the field of disc drive storage devices, and more particularly, but not by way of limitation, to improving the operational response of a disc drive servo system by compensating for an initial nonzero head velocity at the commencement of a position controlled seek.

BACKGROUND OF THE INVENTION

Hard disc drives are commonly used as the primary data storage and retrieval devices in modern computer systems. In a typical disc drive, the data are magnetically stored on one or more discs that are rotated at a constant high speed and accessed by a rotary actuator assembly having a plurality of read/write heads that fly adjacent the surfaces of the discs. A read channel and interface circuit are provided to recover previously stored data from the discs to the host computer.

A closed loop digital servo system such as disclosed in U.S. Pat. No. 5,262,907 issued Nov. 16, 1993 to Duffy et al., is used to control the position of the heads relative to tracks on the discs. The tracks are defined from servo data written to the surfaces of the discs during manufacturing. The servo system of a disc drive utilizes the servo data in the performance of two primary operations: seeking and track following.

Track following entails the continued positioning of a selected head over a corresponding, selected track. A position-control approach is employed wherein the relative position of the head with respect to the center of the track is determined and compared to a desired position for the head. The resulting position error is used to control the amount of current that is applied to the actuator coil in order to maintain the head at the desired position relative to the track.

Seeking entails the movement of a selected head from an initial track to a destination track. For seeks above a certain length, a velocity-control approach is employed wherein the velocity of the head is repetitively determined and compared to a velocity profile which defines an optimum velocity trajectory for the head as it moves to the target track. The amount of current applied to an actuator coil varies in proportion to the velocity error, the actuator coil being part of a voice coil motor used to control the position of the head.

For shorter seeks (such as about 100 tracks or so, depending on the configuration of the drive), some disc drives use a position control approach wherein reference current, velocity and position profiles are generated and used to advance the head to the destination track. Sometimes referred to as "model reference" seeks, such seeks can provide faster response and better settling characteristics than velocity-controlled seeks. A model reference seek typically involves selecting a sinusoidally based reference current profile (such as a 1-cos function), which is scaled using an appropriate scale factor based on the number of tracks in each seek. The scaled current profile is then integrated to provide the corresponding reference velocity and reference position. Model reference seeks are discussed, for example, in U.S. Pat. No. 6,031,684 issued to Gregg.

While advantageously enabling servo systems to provide enhanced positional control, increases in track density make model reference seeks harder to perform. Smaller physical movements of the head from one track to the next require less current, which increases variation in head position, since the servo system has less control over the actuator. Moreover, as track densities increase, errors in the radial position of the servo data as well as vibrations increasingly tend to cause the head to have a small, but nonzero, velocity (either toward the inner diameter or the outer diameter of the disc). The servo system continually operates to compensate for such errors by adjusting the position of the head to follow the selected track.

It has been found that a nonzero initial velocity of the head can significantly degrade the ability of a servo system to accurately move the head from the initial track to the destination track. If the head is already moving toward the destination track at the commencement of a model reference seek, the reference control inputs can cause the head to undershoot the destination track. Conversely, if the head is moving away from the destination track when a model reference seek is initiated, the reference input control may cause the head to overshoot the destination track. In both cases, additional time is required to complete the movement of the head to the desired position over the destination track, reducing transfer rate performance of the disc drive.

Accordingly, with continued advancements in data storage capacities, there is a need to enable drives to perform short, position controlled seeks that compensate for initial nonzero head velocities. It is to such improvements that the present invention is directed.

SUMMARY OF THE INVENTION

The present invention provides a method and apparatus for optimizing the gain of a disc drive servo circuit used to position a head adjacent tracks on a disc of the disc drive. In a preferred embodiment, the present invention provides a method and apparatus for compensating the feed-forward control employed by the model reference controller during a position controlled seek.

The model reference controller is a control system that applies a feed-forward current to the actuator to perform seeks. Predetermined feed-forward tables are used to generate the feed-forward currents based upon the length of the required seeks. The model reference controller uses a plant model and observer circuitry to generate a reference position and reference velocity from the feed-forward current, upon which the loop is closed. The multi-rate observer circuitry estimates the position of the head for each of a plurality of multi-rate periods of the seek, with the position error corresponding to the difference between the reference position and the estimated position at each period.

A current profile is scaled by first and second gains, with the first gain being applied during the acceleration portion of the seek and the second gain being applied during the deceleration portion of the seek. The first and second gains are selected to have different magnitudes when the initial velocity of the head is nonzero.

In addition to providing a model reference controller which accounts for initial head velocity, the present invention effectively reduces the time spent tuning the model reference seek controller loop. The present invention allows the model reference controller to "self-tune" according to pre-calculated factors corresponding to each feed-forward reference table.

These and various other features as well as advantages which characterize the present invention will be apparent

BRIEF DESCRIPTION OF THE DRAWINGS

FIG. 6 provides a flow chart of the seek routine and gain calculation contemplated by the present invention.

DETAILED DESCRIPTION

Figure 1:
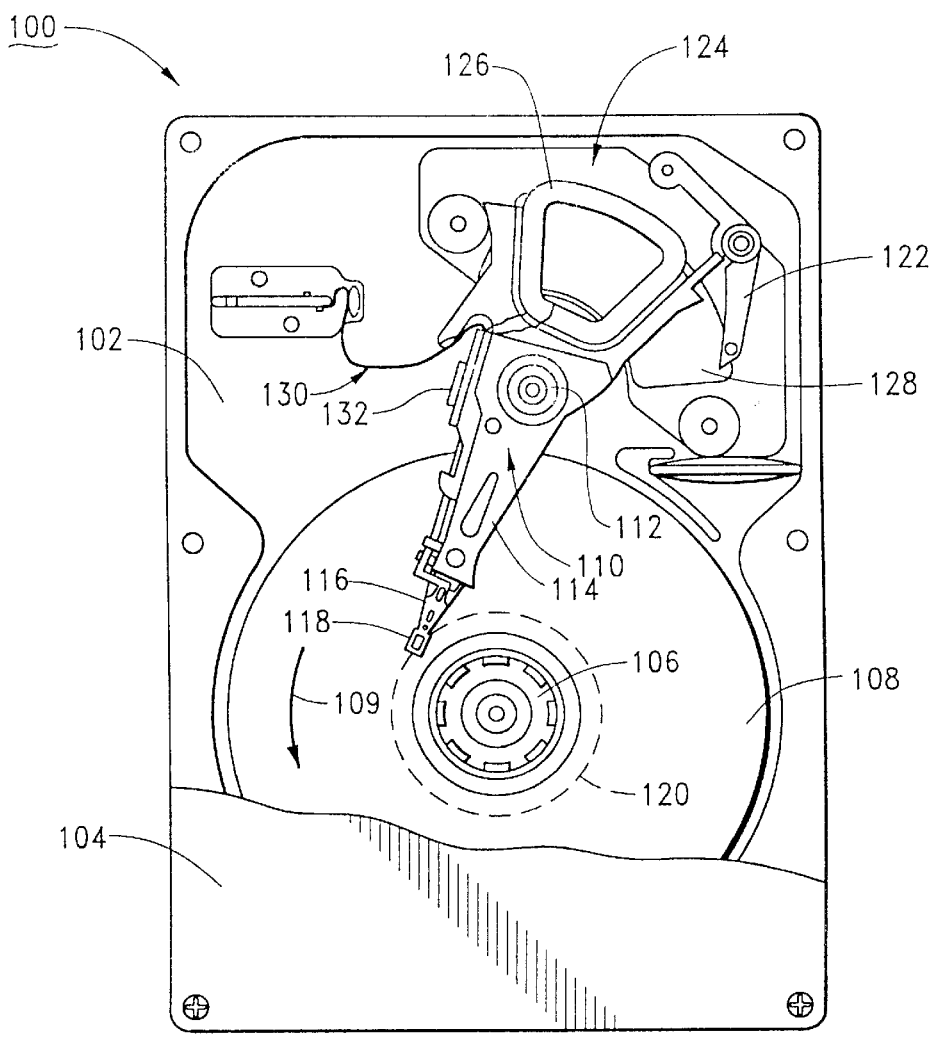
FIG. 1 shows a top plan view of a disc drive constructed in accordance with preferred embodiments of the present invention.

Referring to FIG. 1, shown therein is a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant high speed (in thousands of revolutions per minute) in an angular direction denoted by arrow 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108, with flexible suspension assemblies 116 (flexures) extending therefrom. Mounted at the distal end of each of the flexures 116 is a head 118 which includes a slider assembly (not separately designated) designed to fly in close proximity to the corresponding surface of the associated disc 108. The heads 118 are preferably characterized as magneto-resistive (MR) heads each having a thin-film inductive write element and an MR read element.

When the disc drive 100 is not in use, the heads 118 are moved over and come to rest upon landing zones 120 near the inner diameter of the discs 108 and the actuator assembly 110 is secured using a magnetic latch assembly 122.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. A second magnetic flux path is disposed above the permanent magnet 128, but has not been shown for purposes of clarity. The heads 118 are moved across the surfaces of the discs 108 through the application of current to the coil 126 and the resulting magnetic interaction between the coil 126 and the magnet 128.

A flex assembly 130 provides the requisite electrical connection paths for the actuator assembly 110 while allowing pivotal movement of the actuator assembly 110 during operation. The flex assembly 130 includes a preamplifier/driver circuit 132 (preamp) which applies write currents to the write elements of the heads 118 during a write operation and applies read bias currents to the MR read elements of the heads 118 during a read operation. The preamp 132 further amplifies readback signals obtained during a read operation and provides the same to disc drive control electronics (not shown) disposed on a disc drive printed circuit board (PCB) attached to the underside of the base deck 102.

Figure 2:
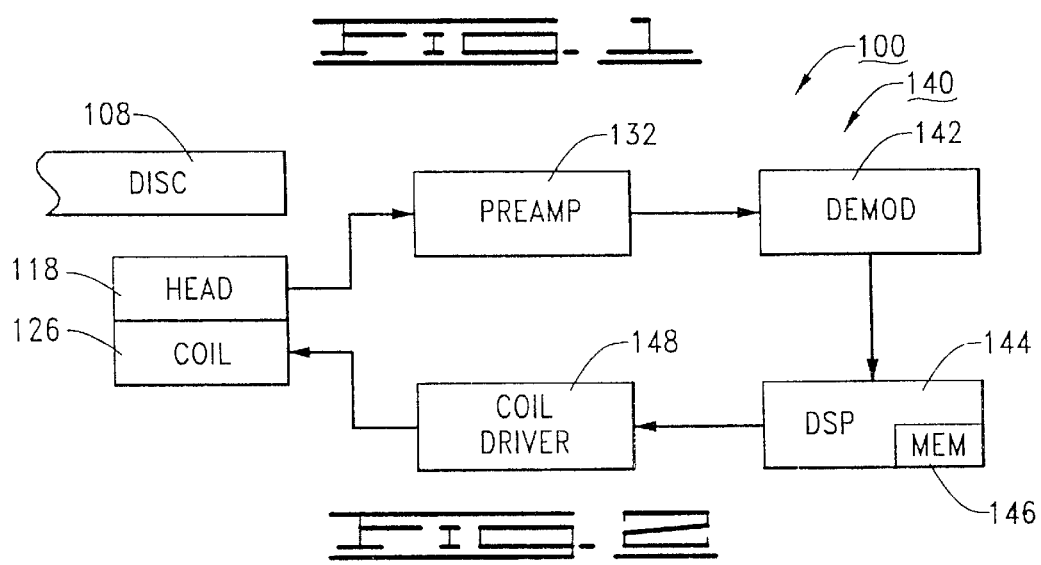
FIG. 2 provides a functional block diagram of the disc drive of FIG. 1.

FIG. 2 shows a functional block diagram of a servo circuit 140 of the disc drive 100 of FIG. 1 which uses servo data arranged on the discs 108 to control the position of the heads 118. The servo data are transduced by the selected head 118, preamplified by the preamp 132, and provided to a demodulation circuit 142 which conditions the servo data for processing by a servo processor 144, which preferably comprises a digital signal processor (DSP). The DSP 144 uses programming steps stored in DSP memory 146 (MEM) as well as commands issued by a top-level disc drive processor (not shown) to output current command signals to coil driver circuitry 148 which, in turn, adjusts the amount of current applied to the coil 126.

Figure 3:
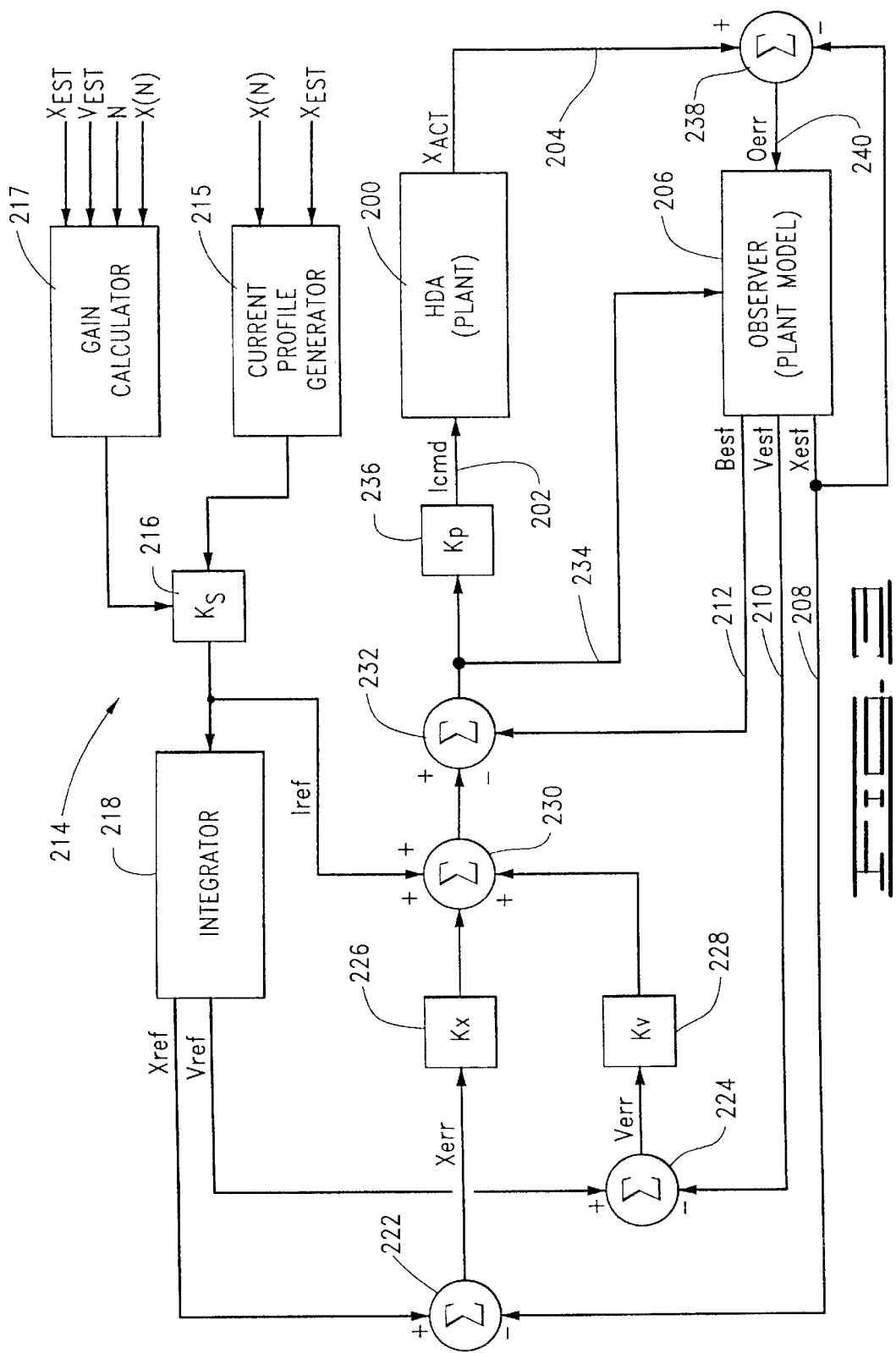
FIG. 3 provides a control diagram of a servo control circuit constructed in accordance with the present invention.

Referring now to FIG. 3, shown therein is a generalized control diagram illustrating the operation of the servo circuit 140 to perform position-controlled seeks ("model reference seeks") in accordance with preferred embodiments of the present invention. Portions of the control diagram of FIG. 3 can be readily implemented through appropriate programming utilized by the DSP 144.

As shown in FIG. 3, a portion of the disc drive 100 referred to as the "plant" is denoted by block 200 and generally comprises the coil driver 148, the actuator assembly 110, the preamp 132 and the demodulator 142. The plant 200 receives a current command signal ("Icmd") on signal path 202 to position the head 118 adjacent a selected track. In response to servo data on the selected track, the plant 200 generates an actual position signal ("Xact") which is output on signal path 204.

The control diagram of FIG. 3 also shows a multi-rate observer 206 having the same nominal input/output response characteristics as the plant 200. The observer 206 repetitively generates position estimates ("Xest"), velocity estimates ("Vest") and a bias estimates ("Best") on signal paths 208, 210 and 212, respectively. The bias estimate takes into account spring forces exerted upon the actuator as a result of the flexure assembly (such as 130 of FIG. 1) and windage forces upon the heads and is indicative of the amount of current required to maintain the selected head at the current position in view of such forces.

A model reference controller (denoted generally at 214) provides position reference ("Xref"), velocity reference ("Vref") and current reference ("Iref") signals indicative of the desired position, velocity and current states for the plant 200 during a model reference seek. The model reference controller 214 includes a current profile generator 215, a gain block 216 with gain Ks, a gain calculator 217 and an integrator block 218. The operation of the model reference controller 214 will be discussed in greater detail below, after a review of the operation of the remaining portions of FIG. 3.

A summing junction 222 determines a position error ("Xerr") as the difference between the position reference Xref and the position estimate Xest. Similarly, a summing junction 224 determines a velocity error ("Verr") as the difference between the velocity reference Vref and the velocity estimate Vest. The position error Xerr is provided to a gain block 226 having a scaler gain of Kx and the velocity error Verr is provided to a gain block 228 having a scaler gain of Kv, so that the output quantities are summed by a summing junction 230 (along with the current reference Iref).

The output of the summing junction 230 is summed with the bias estimate Best at a summing junction 232, as shown. The output of the summing junction 232 is provided on signal path 234 as a control input to the observer 206 and is indicative of the amount of current to be applied to the plant 200.

The output of the summing junction 232 is further provided to a gain block 236 having a gain Kp, so that the output thereof comprises the current command Icmd signal on path 202. The gain block 236 provides the primary gain for the servo circuit 140.

Finally, the actual position signal (Xact) on signal path 204 is summed with the position estimate Xest on path 208 by a summing junction 238 to generate an observer error ("Oerr") signal as an input to the observer 206 on path 240. For reference, the observer 206 is a 4X observer, in that four sets of estimated parameters are output on the paths 208, 210 and 212 for each input of the observer error Oerr signal. Thus, the observer provides a multi-rate of four times the sampling rate of the servo data from the discs 108.

Figure 4:
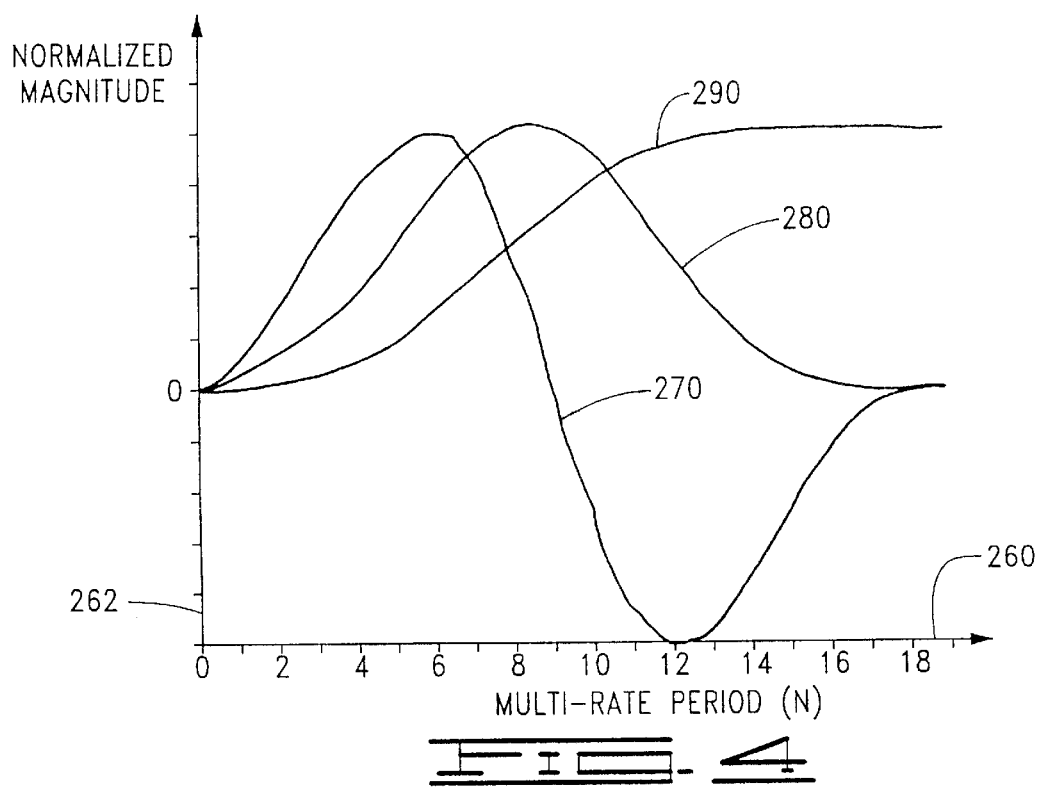
FIG. 4 provides graphical representations of reference current, velocity and position signals output by the reference generator of FIG. 3 during a model reference seek.

Referring now to FIG. 4, shown therein is a set of nominal reference current, velocity and position curves 270, 280 and 290 for a model reference seek, plotted against an x-axis 260 indicative of time (in units corresponding to the multi-rate period) and a y-axis 262 indicative of relative magnitude (with 0 representing no current and no velocity). The discrete reference current values of nominal current reference curve 270 can be readily determined from the following equations:

$$Iref = \frac{1}{2}\left(1 - \cos\left(\frac{[N \bmod C]\pi}{C}\right)\right)\Big|_{N=0}^{N=C-1} \quad (1)$$

$$Iref = \cos\left(\frac{[N \bmod C]\pi}{C}\right)\Big|_{N=C}^{N=2C-1} \quad (2)$$

$$Iref = \frac{1}{2}\left(-1 - \cos\left(\frac{[N \bmod C]\pi}{C}\right)\right)\Big|_{N=2C}^{N=3C-1} \quad (3)$$

where N is the model reference period length, C is a predetermined number associated with the desired duration of the model reference seek and mod is a modulus operator which calculates the remainder of the quotient N/C. As will be recognized, the nominal current reference curve 270 can be readily obtained from equations (1)–(3). Thereafter, the nominal reference velocity curve 280 of FIG. 4 can be obtained by taking the integral of the reference current curve 270 and the nominal reference position curve 290 can be obtained by taking the integral of the reference velocity curve 280.

Although equations (1)–(3) have been found to provide acceptable nominal reference currents for disc drives with lower track densities, as track densities increase, initial velocities associated with head run-out correction may be sufficiently large to prevent the head from properly settling on the destination track. This is illustrated by FIG. 5.

Figure 5:
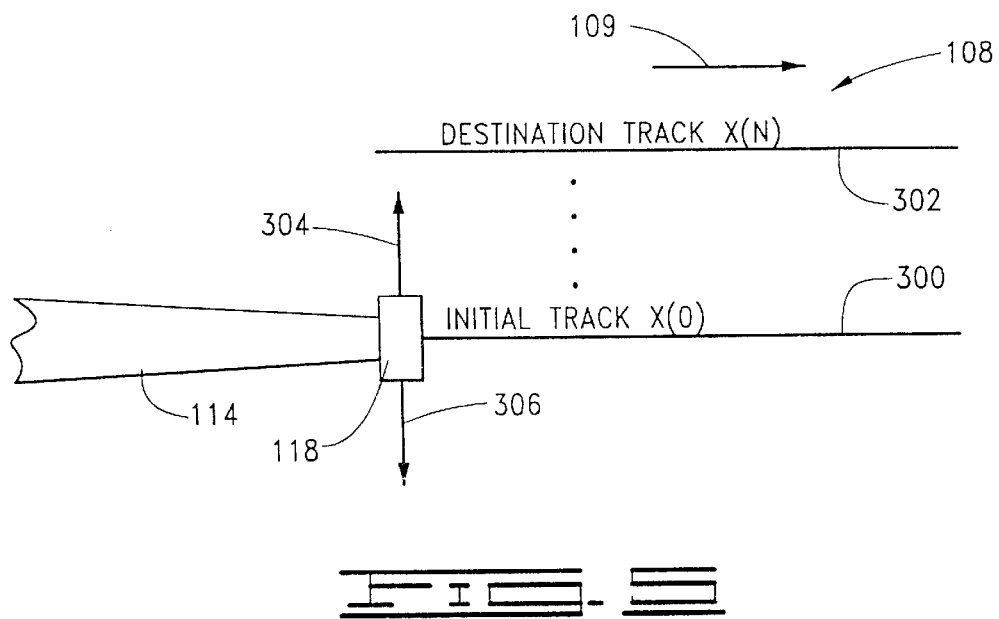
FIG. 5 provides a graphical representation of an initial track, a destination track, and initial velocity of the head of FIG. 1.
Figure 5:
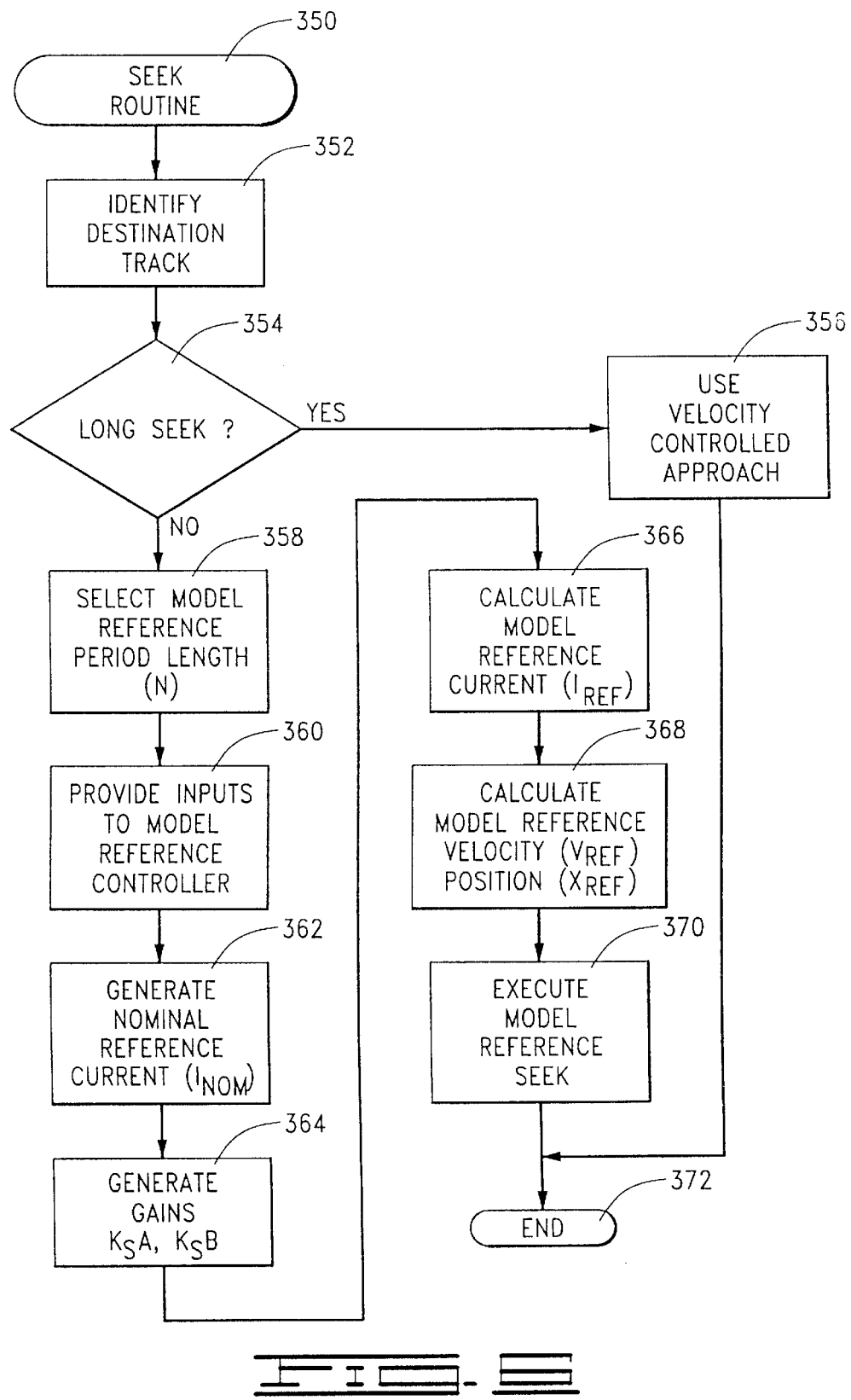

Particularly, FIG. 5 shows an actuator arm 114 supporting a head 118 over an initial track x(0) 300 on the corresponding disc 108. A destination track x(N) 302 is a selected number of tracks away from the initial track x(0) and defines the desired position of the head 118 at the conclusion of the N periods of the model reference seek. The angular motion of the disc is represented by arrow 109. During track following and as a result of track run-out, the head 118 may have an initial nonzero velocity as indicated by directional arrows 304 or 306. This means that, if absolutely no current is applied to the actuator coil 126, at the conclusion of the model reference period N the head 118 will have moved some distance away from the initial track x(0), either toward the destination track x(N) if the initial velocity is in the direction of vector 304, or away from the destination track x(N) if the initial velocity is in the direction of vector 306.

Prior art approaches to performing model reference seeks, such as discussed in the aforementioned U.S. Pat. No. 6,031,684 reference, have involved selecting an appropriate current profile over a desired number of seek periods N, scaling the current profile by multiplying a gain factor appropriate for the seek length to generate the current reference Iref, integrating Iref to get Vref, integrating Vref to get Xref, and then applying the N Iref, Vref and Xref sample values to execute the model reference seek. It has been found, however, that there is no mathematical solution for a single applied gain when the head has sufficient nonzero velocity, as the following analysis will illustrate.

As is widely known, the discrete, linear, time-invariant state-space equation for a position control system (such as the servo circuit 140) is:

$$x(k+1) = A^*x(k) + B^*u(k) \quad (4)$$

where x(k) is the state vector at time k, A is the state matrix, B is the input matrix, and u(k) is the input, or control, at time k. The set of equations governing the model reference seek controller are:

$$X_{ref}(k+1) = X_{ref}(k) + V_{ref}(K) + K_s/2 *_{ref}(k) \quad (5)$$

and $$V_{ref}(k+1) = V_{ref}(k) + K_s * I_{ref}(k) \quad (6)$$

where Iref is the current, Kpt is the gain of the plant, Vref is the generated reference velocity, and Xref is the generated reference position. At the beginning of a model reference seek (k=0), Xref is initialized with the current position and Vref is set to zero (i.e. assume zero initial velocity). Equations (5) and (6) are related to the well known physics equations relating acceleration, velocity, and position (current, or Iref is equivalent to acceleration in this system).

Now, putting equations (5) and (6) into the state space system equation of (4), and selecting the state vector as:

$$x(k) = \begin{bmatrix} X_{ref}(k) \\ V_{ref}(k) \end{bmatrix} \quad (7)$$

and the input as:

$$u(k) = K_s * I_{ref}(k) \quad (8)$$

where $K_s$ is the current gain that is selected for the length of the seek. Combining equations (4)–(8) results in the following:

$$x(k+1) = \begin{bmatrix} 1 & 1 \\ 0 & 1 \end{bmatrix} * x(k) + \begin{bmatrix} \frac{K_s}{2} \\ K_s \end{bmatrix} * I_{ref}(k) \qquad (9)$$

where, $$A = \begin{bmatrix} 1 & 1 \\ 0 & 1 \end{bmatrix} \text{ and } B = \begin{bmatrix} \frac{K_s}{2} \\ K_s \end{bmatrix} \qquad (10)$$

Now, on another note, any future state $x(k)$ of the system based on the initial conditions can be determined using the discrete time, non-homogenous, state transition equation:

$$x(k) = \Phi(k,0) * x(0) + \sum_{j=1}^{k} \Phi(k,j) * B(j-1) * u(j-1) \qquad (11)$$

where $\Phi(k,j)$ is the state transition matrix, $B(j-1)=B$ (i.e. B is constant), and $u(j-1)=K_s * I_{ref}(j-1)$. By definition, $$\Phi(k,j) = A^{k-j} \qquad (12)$$

where A is the state matrix in equation (10). It can be shown through relatively extensive math (omitted here for purposes of brevity) that:

$$\Phi(k,j) = A^{k-j} = \begin{bmatrix} 1 & k-j \\ 0 & 1 \end{bmatrix} \qquad (13)$$

Substituting equations (8) and (13) into equation (11):

$$x(k) + A^k * x(0) + \sum_{j=1}^{k} * B(j-1) * K_s * I_{ref}(j-1) \text{ or,} \qquad (14)$$

$$x(k) = A^k * x(0) + K_s * \sum_{j=1}^{k} A^k * B * I_{ref}(j-1)$$

Rearranging terms:

$$x(k) - A^k * x(0) = K_s * \sum_{j=1}^{k} A^k * B * I_{ref}(j-1) \text{ and,} \qquad (15)$$

$$x(k) - A^k * x(0) = \qquad (16)$$

$$K_s * \sum_{j=1}^{\frac{k}{2}} A^{k-1} * B * I_{ref}(j-1) + K_s * \sum_{i=\frac{k}{2}+1}^{k} A^{k-i} * B * I_{ref}(j-1)$$

Now, if there are N points in the feed-forward table $I_{ref}$, replacing k with N results in the following relation:

$$x(N) - A^N * x(0) = \qquad (17)$$

-continued $$K_s * \sum_{j=1}^{\frac{N}{2}} A^{N-j} * B * I_{ref}(j-1) + K_s * \sum_{i=\frac{N}{2}+1}^{N} A^{N-i} * B * I_{ref}(j-1)$$

Analyzing equation (17), it can be seen that, at the beginning of a seek, the initial conditions of the seek $x(0)$, B, Iref, N, and the state transition matrix are known. Because the desired final states, $x(N)$, are also known, all that is left to solve for is $K_s$. Solving for $K_s$ will give the feed-forward gain needed to go from $x(0)$ to $x(N)$.

However, by inserting an initial velocity into this equation at $x(0)$, it can readily be seen that a single solution for $K_s$ does not exist. However, if different gains for the positive and negative parts of the table are used, then a solution does exist.

Placing separate gains (KsA and KsB) into equation (17) results in the following:

$$x(N) - A^N * x(0) = \qquad (18)$$

$$K_sA * \sum_{j=1}^{\frac{N}{2}} A^{N-j} * B * I_{ref}(j-1) + K_sB * \sum_{i=\frac{N}{2}+1}^{N} A^{N-i} * B * I_{ref}(j-1)$$

The result of the left hand side of equation (18) is a 2×1 vector, as is the result of both summations on the right hand side. Therefore, this equation is of the form:

$$S*y=b \qquad (19)$$

where b is the result of the left hand side of (18) and the first term of b represents the difference between the final position $x(N)$ and the position that would have been reached had no current been applied. The second term of b represents the velocity of the head in its final state subtracted by the velocity which would have resulted had no current been applied to the current. S is a 2×2 matrix where the first row is the transpose of the first summation of equation (18) and the second row is the transpose of the second summation of equation (18).

The first term of the first row of S relates the change of head position with respect to incremental quantities of current applied to the plant during the acceleratory phase of the model reference seek. The first term in the second row of S relates the change in head velocity with respect to incremental quantities of current applied to the plant during the acceleratory phase of the model reference seek. The second term of the first row of S relates the change in head position with respect to a current applied to the plant during the deceleratory portion of the model reference seek. The second term of the second row of S relates the change in head velocity with respect to current applied to the plant during the deceleratory portion of the model reference seek. Accordingly, the 2×1 vector y is:

$$y = \begin{bmatrix} K_sA \\ K_sB \end{bmatrix} \qquad (20)$$

The two gains KsA, KsB can be determined by taking the inverse of S and multiplying both sides to get:

$$y = \begin{bmatrix} K_sA \\ K_sB \end{bmatrix} = S^{-1} * b \quad (21)$$

The result is one gain (KsA) for the first half, or positive half, of the feed-forward table and one gain (KsB) for the second half, or negative half, of the reference current profile.

The individual terms of S, and hence $S^{-1}$, are precalculated during manufacture for each model reference period length (N) and stored in memory for subsequent retrieval. Knowing the initial position Xest, the destination track x(N), and the initial velocity Vest, the only calculations which must be performed to solve for b are the left hand side of equation (18) and equation (20). Once b is determined and the appropriate values of $S^{-1}$ are retrieved from memory, the gain calculator 314 calculates y which provides a pair of gains that subsequently compensate for initial velocity by modifying the nominal reference current. Thus, only eight multiplications and six additions must be done in real time in order to determine gains KsA and KsB for each model reference seek.

As a result of the operation of the gain calculator 314, the model reference controller 214 operates as a self-tuning device. That is, because the gain calculator 314 determines the gains necessary to scale the nominal reference current, no manual tuning is necessary for each nominal reference current generated by the feed-forward table. The elimination of the need for manual tuning significantly improves manufacturing efficiency and cost-effectiveness.

Now that a basis for using two gains during a model reference seek has been established, how the model reference controller 214 compensates for an initial head velocity will now be discussed. Referring to FIG. 6, the seek routine 350 begins by identifying a destination track position x(N) as shown by step 352. Decision step 354 determines whether or not the seek is a long seek, i.e., whether x(N) 302 is greater than 100 tracks away from the initial track x(0) 300. If the seek to destination track x(N) 302 is determined to be a long seek, the seek routine utilizes a velocity controlled approach as indicated by step 356. The head is moved using a conventional velocity controlled approach until it reaches the destination track x(N) 302, after which, the seek routine terminates as indicated by step 372.

However, if the seek is determined to be a short seek, the routine proceeds to step 358 where the model reference period length (N) is determined in relation to the number of tracks to be crossed during the seek. It will be readily understood that the model reference period length (N) does not directly correspond to the number of tracks crossed on a one-to-one basis. Rather, a single model reference period length (N) may be used for a range of seek lengths, with different current profiles to account for these different seek lengths.

Once the model reference period length (N) is determined, the seek routine passes to step 360 where the model reference controller 214 receives the requisite inputs. Specifically, the period length (N) is inputted to the gain calculator 314 as indicated in FIG. 3. Also inputted to the gain calculator 314 are the destination track (position) x(N) 302, the initial position estimate Xest, and the initial velocity estimate Vest. It will be understood that the values inputted to the gain calculator 314 for Xest and Vest are taken from the observer 206 along paths 208 and 210 respectively.

The destination track x(N) 302 and the position estimate Xest are also inputted into the current profile generator 316. Again, it will be understood that the value of Xest inputted into the current profile generator 316 is taken from the observer 206 along path 208. Once each of the four inputs have been made to the gain calculator 314 and each of the two inputs have been made to the current profile generator 316, the seek routine passes to step 362 where the current profile generator 316 calculates the reference current profile.

Upon receiving the destination track x(N) 302 and the position estimate Xest, the current profile generator determines the model reference period N. The model reference period N is then used to calculate the nominal reference current using equations (1)–(3) as described above.

Once a nominal reference current has been calculated, the routine passes to step 364 where gains KsA and KsB are calculated. As described above, once the model reference period length (N), the initial track x(0), the destination track x(N) and an initial velocity are known, the gain calculator solves for KsA and KsB using equation 21 and the appropriate $S^{-1}$ matrix precalculated and stored in memory. Once the two gains KsA and KsB are determined, the seek routine passes to step 366 where a model reference current (Iref) is determined by gain circuit 312. Gain circuit 312 creates the model reference current by scaling the nominal reference current received from the current profile generator 316 with the gains KsA and KsB derived by the gain calculator 314. As described above, the first gain, KsA, scales the acceleration portion of the nominal reference current and the second gain, KsB, scales the deceleration portion of the nominal reference current. The resulting model reference current (Iref) compensates the model reference seek for an initial head velocity.

Continuing with FIG. 6, the seek routine next passes to step 368 where the integrator block 310 receives the model reference current Iref from the gain circuit 312. As indicated above, the model reference current is also sent to summing junction 230 along path 220. The integrator block 310 determines the model reference velocity Vref by integrating the model reference current Iref. In turn, the model reference position Xref is determined by integrating the model reference velocity Vref. The derivative relationship between Xref, Vref, and Iref is discussed above in connection with the well known state-space equations (4)–(6).

Once determined, the model reference position Xref and model reference velocity Vref are sent to summing junctions 222 and 224 along paths 216 and 218 respectively. At this time, the seek routine passes to step 370 where the servo circuit 140 executes the model reference seek as previously described with values for Iref, Vref, and Xref generated by the model reference controller 214. Upon completion of the seek, the routine terminates at step 372.

Figure 7:
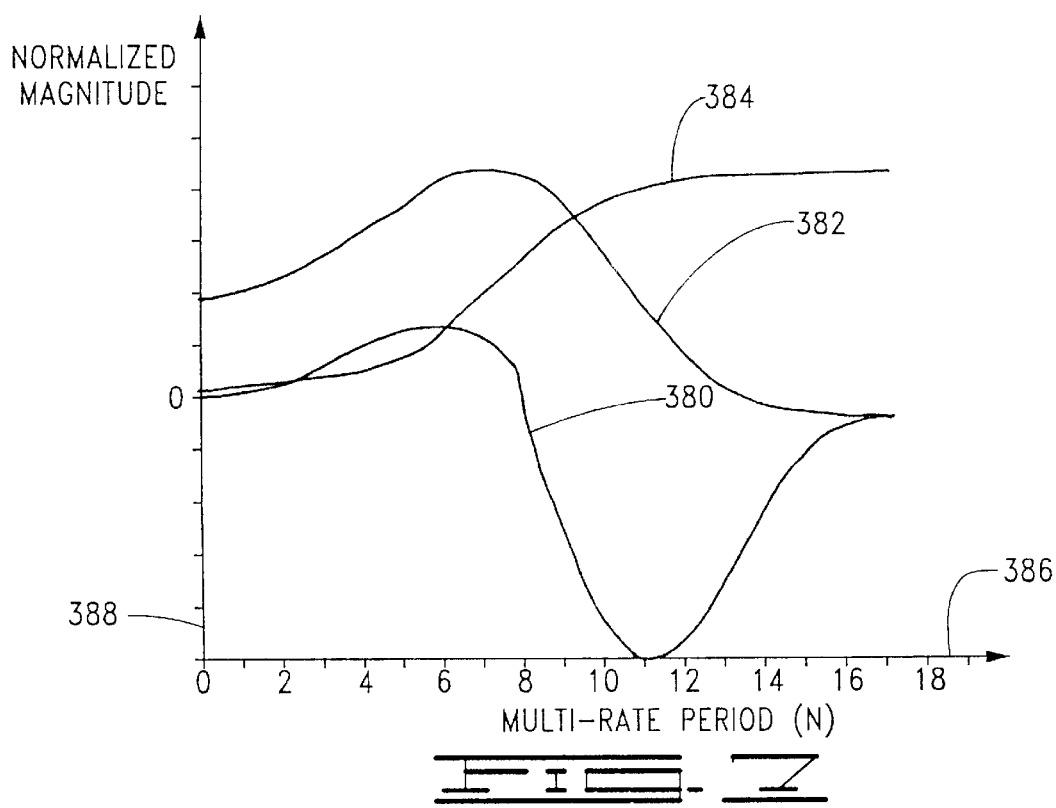
FIG. 7 provides graphical representations of reference current, velocity, and position signals output by the reference generator of FIG. 3 during a model reference seek in which the head has a positive initial velocity in relation to the destination track as depicted in FIG. 5.

FIG. 7 shows a set of model reference current 380, velocity 382 and position 384 curves for a model reference seek, plotted against an x-axis 386 indicative of time (in units corresponding to the multi-rate period) and a y-axis 388 indicative of relative magnitude (with 0 representing no current or velocity). The velocity curve 382 intercepts the y-axis 388 above zero indicating the presence of an initial head velocity in the positive direction, as illustrated by vector 304 in FIG. 5. That is, the head has a nonzero initial velocity and is moving in a direction toward the destination track at commencement of the model reference seek.

As shown in FIG. 7, in order to compensate for the positive initial velocity, the amplitude of the model reference current curve 380 is smaller while scaled with the first gain KsA during the acceleration portion of the model reference seek. During the deceleration portion of the model reference seek, the amplitude of the model reference current curve increases as the second gain KsB is applied to the nominal reference current.

Figure 8:
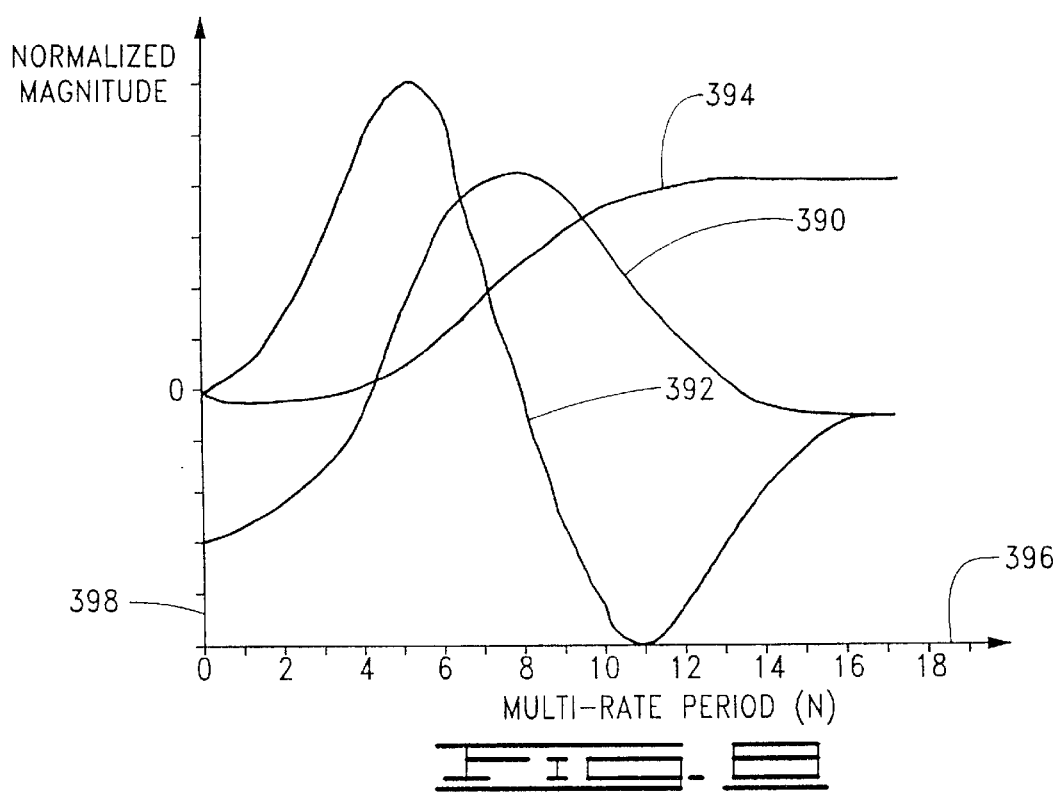
FIG. 8 provides graphical representations of reference current, velocity, and position signals output by the reference generator of FIG. 3 during a model reference seek in which the head has a negative initial velocity in relation to the destination track as depicted in FIG. 5.

FIG. 8 shows a model reference seek performed when the head has a negative initial velocity as illustrated by vector 306 in FIG. 5, so that the head is moving away from the destination track at the commencement of the model reference seek. Model reference velocity curve 390 has a y-intercept below zero indicating a negative initial velocity. Accordingly, the amplitude of the model reference current curve 392 is larger during the acceleration portion of model reference seek. During the deceleration portion of the seek, the amplitude of the model reference current curve 392 is smaller as the second gain KsB is applied to the nominal reference current. It will be noted that the model reference position curve 394 exhibits a negative direction before the model reference velocity has compensated for the initial negative head velocity.

The present invention, as embodied hereinabove and claimed below, provides several advantages over the prior art. First, the model reference generator produces model reference current (Iref), model reference velocity (Vref) and model reference position (Xref) which compensate for an initial nonzero head velocity. In doing so, the accuracy and reliability of short position controlled seeks is improved in disc drives with elevated TPI. Second, the present invention also provides for self-tuning of the model reference controller, thereby reducing the costs associated with manufacture.

In summary, it will be recognized that the present invention is directed to an apparatus and method for optimizing the model reference current (Iref) employed by a model reference controller during a model reference seek. In a preferred embodiment of the present invention, the model reference controller 214 is part of the servo circuit 140 and comprises an integrator block 310, a gain circuit 312, a gain calculator 314, and a current profile generator 316. The model reference controller 214 generates reference current, velocity and position signals (such as 220, 218 and 216) which compensate for an initial head velocity and are used to position a head 118 during a model reference seek (such as by steps 358–370). A multi-rate observer 200 provides estimates of position (Xest), velocity (Vest), and bias (Best). The output estimates of the observer 200 are compared to the outputs from the model reference controller 214 and a position error signal is determined.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a position control system, a method for moving a control object from an initial position to a destination position comprising steps of:
   (a) selecting a number of successive time periods over which to move the control object;
   (b) providing a nominal current profile with current values corresponding to the number of successive time periods;
   (c) determining an initial velocity of the control object; and
   (d) generating a reference current profile by applying a first gain factor to a first series of current values of the nominal current profile used to accelerate the control object and by applying a second gain factor to a second series of current values of the nominal current profile used to decelerate the control object, the first and second gain factors selected to have different magnitudes to compensate for an initial nonzero velocity of the control object.

2. The method of claim 1, further comprising a step (e) generating a reference velocity profile by integrating the reference current profile.

3. The method of claim 2, further comprising a step (f) generating a reference position profile by integrating the reference velocity profile.

4. The method of claim 1, further comprising a step (g) comparing the model reference current, the model reference velocity, and the model reference position to an estimated current, an estimated velocity, and an estimated position to determine a current command signal used in positioning the control object.

5. A disc drive, comprising:
   a rotatable disc having a recording surface;
   an actuator assembly comprising:
      an actuator motor; and
      a head supported adjacent the recording surface; and
   a servo circuit which applies a model reference current to the actuator motor to controllably move the head from an initial position to a destination position on the recording surface, comprising:
      a current profile generator which generates a baseline reference current profile as a sequence of current values corresponding to each of a succession of time periods during which the head is moved;
      a velocity determination circuit which determines an initial velocity of the head;
      a gain calculator, responsive to the velocity determination circuit, which calculates first and second gain factors in relation to the initial velocity; and
      a gain block, responsive to the gain calculator and the current profile generator, which generates the model reference current by applying the first gain factor to a first series of the current values of the baseline reference current profile used to accelerate the head and subsequently applying the second gain factor to a second series of the current values of the baseline reference current profile used to decelerate the head, wherein the first and second gain factors have different respective magnitudes when the initial velocity of the head is nonzero.

6. The disc drive of claim 5, wherein the servo circuit further comprises an integrator circuit which integrates the model reference current to obtain a model reference velocity.

7. The disc drive of claim 6, wherein the integrator circuit further integrates the model reference velocity to obtain a model reference position.

8. The disc drive of claim 7, wherein the servo circuit further comprises:
   an estimator circuit which generates an estimated current, estimated velocity and estimated position; and
   a comparator circuit which respectively compares the estimated current with the model reference current, the estimated velocity with the model reference velocity, and the estimated position with the model reference position.

9. A disc drive, comprising:
   a servo circuit which applies current to a voice coil motor used to controllably position a head adjacent a recording surface of a rotatable disc; and
   compensation means for compensating the current applied to the voice coil motor for an initial head velocity.

* * * * *